(12) United States Patent
Varshney et al.

(10) Patent No.: US 12,401,864 B2
(45) Date of Patent: Aug. 26, 2025

(54) SYSTEMS AND METHODS FOR ADVERTISEMENT PLAYBACK BASED ON PREFERRED VIEWING DURATION

(71) Applicant: SAMSUNG ELECTRONICS CO., LTD., Suwon-si (KR)

(72) Inventors: Nitish Varshney, Bengaluru (IN); Pratyush Pushkar, Bengaluru (IN); Arun Kunnappillil Madhusoodhanan, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/239,567

(22) Filed: Aug. 29, 2023

(65) Prior Publication Data

US 2023/0403441 A1     Dec. 14, 2023

Related U.S. Application Data

(63) Continuation of application No. PCT/KR2023/007390, filed on May 30, 2023.

(30) Foreign Application Priority Data

May 30, 2022   (IN) .............................. 202241030970
Aug. 16, 2022   (IN) .............................. 202241030970

(51) Int. Cl.
*H04N 21/81*     (2011.01)
*H04N 21/234*     (2011.01)
(Continued)

(52) U.S. Cl.
CPC ..... *H04N 21/812* (2013.01); *H04N 21/23424* (2013.01); *H04N 21/25891* (2013.01); *H04N 21/47217* (2013.01)

(58) Field of Classification Search
CPC .......... H04N 21/812; H04N 21/23424; H04N 21/25891; H04N 21/47217
See application file for complete search history.

(56) References Cited

U.S. PATENT DOCUMENTS

| | | | |
|---|---|---|---|
| 2002/0178447 | A1 | 11/2002 | Plotnick et al. |
| 2010/0166389 | A1 | 7/2010 | Knee et al. |

(Continued)

FOREIGN PATENT DOCUMENTS

| | | |
|---|---|---|
| CN | 113242454 A | 8/2021 |
| WO | 2011/142486 A1 | 11/2011 |
| WO | 2014/078805 A1 | 5/2014 |

OTHER PUBLICATIONS

International Search Report and Written Opinion (PCT/ISA/210 and PCT/ISA/237) dated Sep. 22, 2023, issued by International Searching Authority in International Application No. PCT/KR2023/007390.

(Continued)

*Primary Examiner* — Nathan J Flynn
*Assistant Examiner* — Christine A Kurien
(74) *Attorney, Agent, or Firm* — Sughrue Mion, PLLC

(57) ABSTRACT

Provided is a system and method for displaying an advertisement. The method for displaying an advertisement, includes receiving, by an advertisement server, an advertisement request from a media playback service subsequent to an initiation of a media playback on an electronic device of a user, identifying, by the advertisement server, at least one eligible advertisement, based on the advertisement request, retrieving, by the advertisement server, an advertisement profile of the user, determining, by the advertisement server, a preferred viewing duration associated with each of the at least one eligible advertisement, based on a correlation of each of the at least one eligible advertisement with the advertisement profile of the user, and obtaining, by (Continued)

the advertisement server, a summarized version of an advertisement selected from the at least one eligible advertisement based on the preferred viewing duration of the user.

21 Claims, 14 Drawing Sheets

(51) Int. Cl.
*H04N 21/258* (2011.01)
*H04N 21/472* (2011.01)

(56) References Cited

U.S. PATENT DOCUMENTS

| | | | |
|---|---|---|---|
| 2011/0010231 A1* | 1/2011 | Price | G06Q 30/0269 705/14.1 |
| 2011/0282742 A1 | 11/2011 | Umeda | |
| 2012/0110615 A1 | 5/2012 | Kilar et al. | |
| 2014/0157306 A1* | 6/2014 | Deo | H04N 21/812 725/34 |
| 2017/0188115 A1 | 6/2017 | Bafekr | |
| 2018/0150871 A1 | 5/2018 | Adoni et al. | |
| 2020/0336791 A1 | 10/2020 | Johnson | |

OTHER PUBLICATIONS

Chantal Tode, Very short video ads have advantage on smartphones: report, Marketing Dive, Mar. 16, 2016, 4 pages. https://www.luxurydaily.com/very-short-video-ads-have-advantage-onsmartphones-report/.

H.B. Duran, Study: Reward-Based Ads Highly-Effective With Mobile Gamers, Jul. 28, 2016, Marketing Today, 4 pages, https://www.alistdaily.com/digital/study-reward-based-ads-highlyeffective-mobile-gamers/.

Communication issued Apr. 8, 2025 by the Intellectual Property India in Indian Patent Application No. 202241030970.

* cited by examiner

SYSTEMS AND METHODS FOR ADVERTISEMENT PLAYBACK BASED ON PREFERRED VIEWING DURATION

CROSS-REFERENCE TO RELATED APPLICATION(S)

This application is a continuation of PCT International Application No. PCT/KR2023/007390, which was filed on May 30, 2023, and claims priority to Indian Provisional Patent Application No. 202241030970, filed May 30, 2022, and Indian Complete Patent Application No. 202241030970, filed Aug. 16, 2022, in the Indian Patent Office. The disclosures of which are incorporated herein by reference in their entireties.

BACKGROUND

1. Field

The disclosure relates to advertisements, and more particularly, to systems and methods for playback of advertisements based on a preferred viewing duration.

2. Description of Related Art

When an ad/advertisement is displayed to a user during some media playback, the user may either view the full ad or skip/fast-forward to the end of the ad. There are various categories of ads, such as pre-roll advertisements which are played before a program/media starts to play, mid-roll advertisements which are played in between the program/media, and post-roll advertisements which are played after the end of the program/media.

FIG. 1 illustrates various types of ads displayed in a program content, according to the related art. As shown in FIG. 1, the ads displayed in a program may include pre-roll, mid-roll, and post-roll ads. Further, various kinds of ads that may be displayed may include linear ads and non-linear ads. Linear ads may be characterized as ads that play either before, during or after a piece of video content and are played within the main video player, where the actual video content will be viewed. These ads are also referred to as linear video ads because they run in line sequentially with the video content. The non-linear ads may be characterized as the ads appearing alongside video content, running concurrently without disrupting content playback. Additionally, banner ads and icon ads are also shown during media playback.

FIG. 2 illustrates various types of ads displayed in a media content, according to the related art. Referring to FIG. 2, the ads may be displayed with a skip button. On click of the skip button, ad content directly moves to last frame of ad. As is widely known, a majority of people like to see ads including a skip button. Further, ads may be displayed in a short video ad format/bumper ads (around 6 seconds or less) designed to allow to reach more customers and increase awareness about brand. The 6-second ads deliver an increase in estimated ad recall, return on ad spend and increase in video completion rate. Another format used for ads playback may include ads which provide in-app or in-service awards for watching an ad till the end. Such ads have a positive impact on both revenue and user engagement. Rewarding ads are known to lift the aided awareness and mobile ad recall.

Further, there are various problems associated with existing one-ad-length-fits-all techniques, as per the related art. Generally, users prefer short video ads. Further, different lengths of ads may be effective for different brand tenures, brand goals and age of users. Furthermore, even though rewarding ads are highly effective, they only provide rewards only on 100% view of the ads which may be irritating for the users and thereby limiting the reach. Additionally, there are known ways to have a more focused advertising such as methods to prevent fatigue, such as repurposing ads, rotating or switching ads. As one example, short ads with short content do especially well on smartphones, outperforming in terms of ad recall compared to tablets and PCs.

SUMMARY

In all the above various ad types, the ad campaigns and creatives are generated by focusing on ad type, optimal duration of ads to create an effect, category of ad campaign and a cluster of users that the advertiser would like to target on. Further, some techniques focus on demographic or domain of ads preferred by users to have a more focused advertising. None of the existing techniques provide a methodology to analyze duration of ads preferred by the users. This would be a win-win situation for the advertiser (can fit the ad in specific timeframe) and the user (by limiting ad view duration to the interested timeframe) that would result in achieving higher number of "Video Completion Events" and Impression Rate, hence improving ad revenue.

Accordingly, there is a need for an improved system and method for analysis of user preferences to watch advertisements. More specifically, there is a need to analyze users' preferred duration for the advertisements to be displayed along with media playback.

According to an aspect of the disclosure, a method for displaying an advertisement, includes: receiving, by an advertisement server, an advertisement request from a media playback service subsequent to an initiation of a media playback on an electronic device of a user; identifying, by the advertisement server, at least one eligible advertisement, based on the advertisement request; retrieving, by the advertisement server, an advertisement profile of the user; determining, by the advertisement server, a preferred viewing duration associated with each of the at least one eligible advertisement, based on a correlation of each of the at least one eligible advertisement with the advertisement profile of the user; and obtaining, by the advertisement server, a summarized version of an advertisement selected from the at least one eligible advertisement based on the preferred viewing duration of the user.

The method may further include: monitoring at least one user interaction during at least one advertisement playback on the electronic device; determining a plurality of advertisement parameters associated with each of the at least one user interaction, and a plurality of advertisement parameters associated with a demographic data of the user; and creating the advertisement profile of the user based on the plurality of advertisement parameters associated with the at least one user interaction.

The demographic data of the user may include at least one of a purchasing preference, a viewed content, a visited application, an estimated worth of the user, or an action of another user in a same household as the user.

The plurality of advertisement parameters may include at least one of an advertisement genre, an advertisement duration, or a user action associated with each advertisement displayed on the electronic device during the at least one advertisement playback.

The user action associated with each advertisement displayed on the electronic device during the at least one advertisement playback may include at least one of watching the advertisement, skipping the advertisement, changing a volume level, fast forwarding the advertisement, or viewing an additional detail associated with the advertisement.

The summarized version of the selected advertisement may be associated with a first playback duration that is different than a second playback duration associated with an original version of the selected advertisement.

The summarized version of the selected advertisement may be associated with a higher probability of user interaction than the original version of the selected advertisement.

The method may further include: providing, by the advertisement server, the summarized version of the selected advertisement, for display on the electronic device.

The method may further include: providing, by the advertisement server, the summarized version of the selected advertisement and the original version of the selected advertisement, for display on the electronic device.

The method of the obtaining the summarized version of the advertisement selected from the at least one eligible advertisement based on the preferred viewing duration of the user may include: determining the summarized version of the selected advertisement by modifying at least one of a human face, a background, a voice, or a language in the selected advertisement, based on the advertisement profile of the user.

The method may further include: obtaining, by the advertisement server, a plurality of versions of each of a plurality of advertisements selected from the at least one eligible advertisement based on the preferred viewing duration of the user; and providing, by the advertisement server, the plurality of versions of each of the plurality of selected advertisements, for display on the electronic device.

In an embodiment, each of the plurality of versions of the plurality of selected advertisements may be associated with a rank for displaying on the electronic device.

According to an aspect of the disclosure, a method of displaying an advertisement, includes: monitoring a plurality of advertisement parameters associated with an advertisement interaction behavior of a user, during at least one advertisement playback on an electronic device of the user; determining a correlation of the plurality of advertisement parameters with the advertisement interaction behavior of the user, to create an advertisement profile of the user; receiving an advertisement request from a media playback service subsequent to initiation of a media playback on the electronic device; and obtaining, based on the correlation, a summarized version of a selected advertisement that matches the advertisement profile of the user, from a plurality of versions of the selected advertisement.

The plurality of advertisement parameters may include at least one of an advertisement genre, an advertisement duration, and a user action during playback of the advertisement.

The method may further include: monitoring a plurality of advertisement parameters associated with a demographic data of the user, during at least one advertisement playback on the electronic device.

According to an aspect of the disclosure, a system to display an advertisement, includes: a memory and at least one processor. The memory is configured to store at least one instruction, and the at least one processor is configured to execute the at least one instruction to: receive an advertisement request from a media playback service subsequent to an initiation of a media playback on an electronic device of a user; identify at least one eligible advertisement, based on the advertisement request; retrieve an advertisement profile of the user; determine a preferred viewing duration associated with each of the at least one eligible advertisement, based on a correlation of each of the at least one advertisement with the advertisement profile of the user; and obtain a summarized version of an advertisement selected from the at least one eligible advertisement based on the preferred viewing duration of the user.

The at least one processor may be further configured to execute to the at least one instruction to: monitor at least one user interaction during at least one advertisement playback on the electronic device; determine a plurality of advertisement parameters associated with each of the at least one user interaction, and a plurality of advertisement parameters associated with a demographic data of the user; and create the advertisement profile of the user based on the plurality of advertisement parameters associated with the at least one user interaction.

The demographic data of the user may include at least one of a purchasing preference, a viewed content, a visited application, an estimated worth of the user, or an action of another user in a same household as the user.

The summarized version of the selected advertisement may be associated with a first playback duration that is different than a second playback duration associated with an original version of the selected advertisement.

The summarized version of the selected advertisement may be associated with a higher probability of user interaction than the original version of the selected advertisement.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
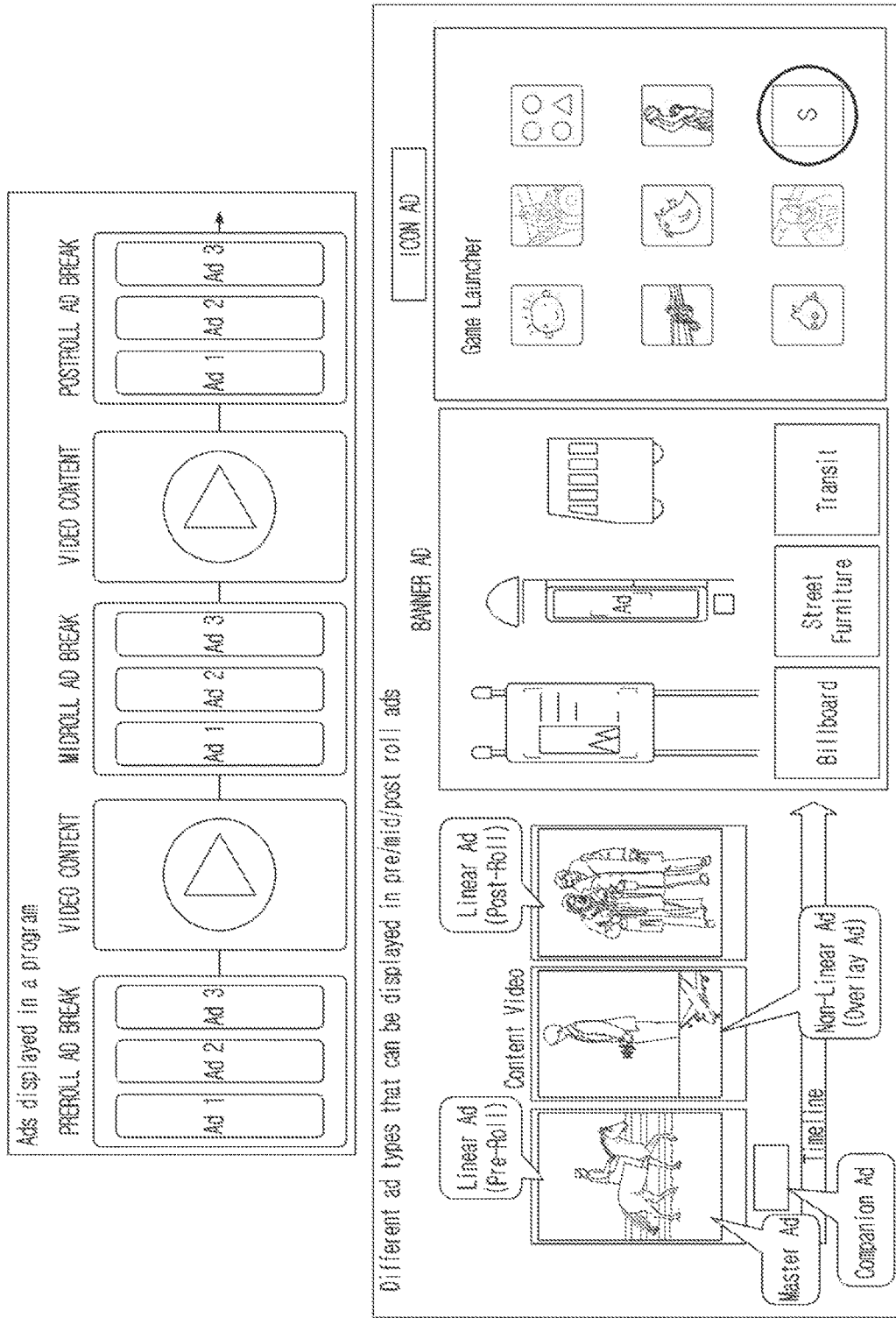
FIG. 1 illustrates various types of ads displayed in a program content, according to the related art.
Figure 2:
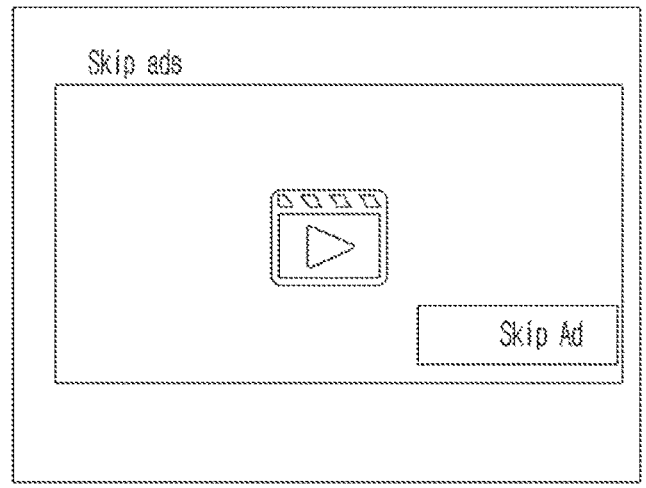
FIG. 2 illustrates various types of ads displayed in a media content, according to the related art.
Figure 2:
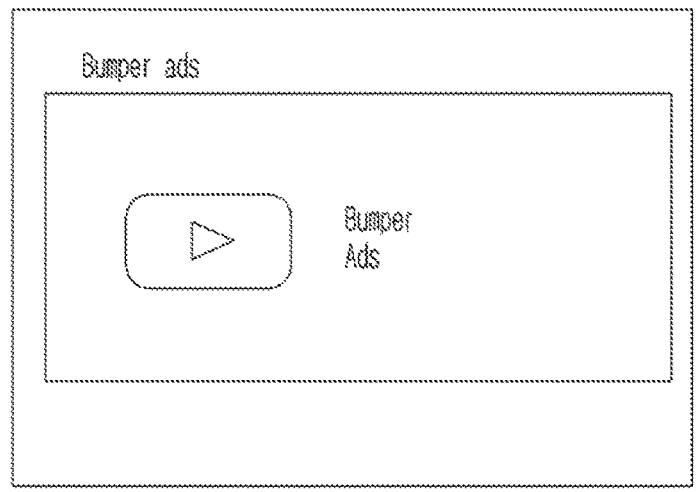
Figure 2:
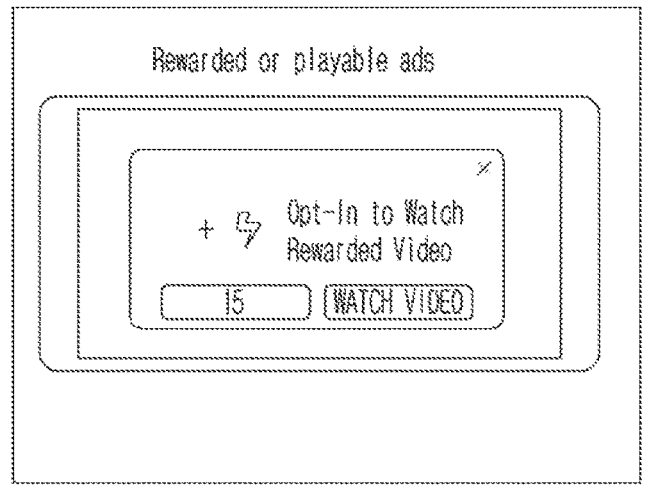

For the purpose of promoting an understanding of aspects of the present disclosure, reference will now be made to various embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

According to an embodiment, a user's preferred advertisement viewing duration for each eligible ad are identified, breaking one-duration-fits-all strategy, and providing advertisements of a specific duration for user that's more liked by user.

According to an embodiment, a system and method for identifying the users and categorizing each one of them based on the ad duration that the user is willing to spent on various ads is disclosed. Specifically, in response to receiving an incoming ad request for a user, a preferred viewing duration of each of the eligible advertisements for the user is determined using user's ad profile created using ad interaction behavior and user demographic data. Further, a summarized version is selected to display by correlating the user's preferred viewing duration with target user's ad profile, eligible ads to be displayed and user's activity patterns on ads displayed earlier.

The term "ad" and "advertisement" have been used interchangeably throughout this disclosure and thus, these terms may be accorded the same meaning. The term "viewing" may imply a watch time of a video advertisement, or a listening time of an audio advertisement.

Various embodiments of the present disclosure will be described below in detail with reference to the accompanying drawings in which like characters represent like parts throughout.

Figure 3:
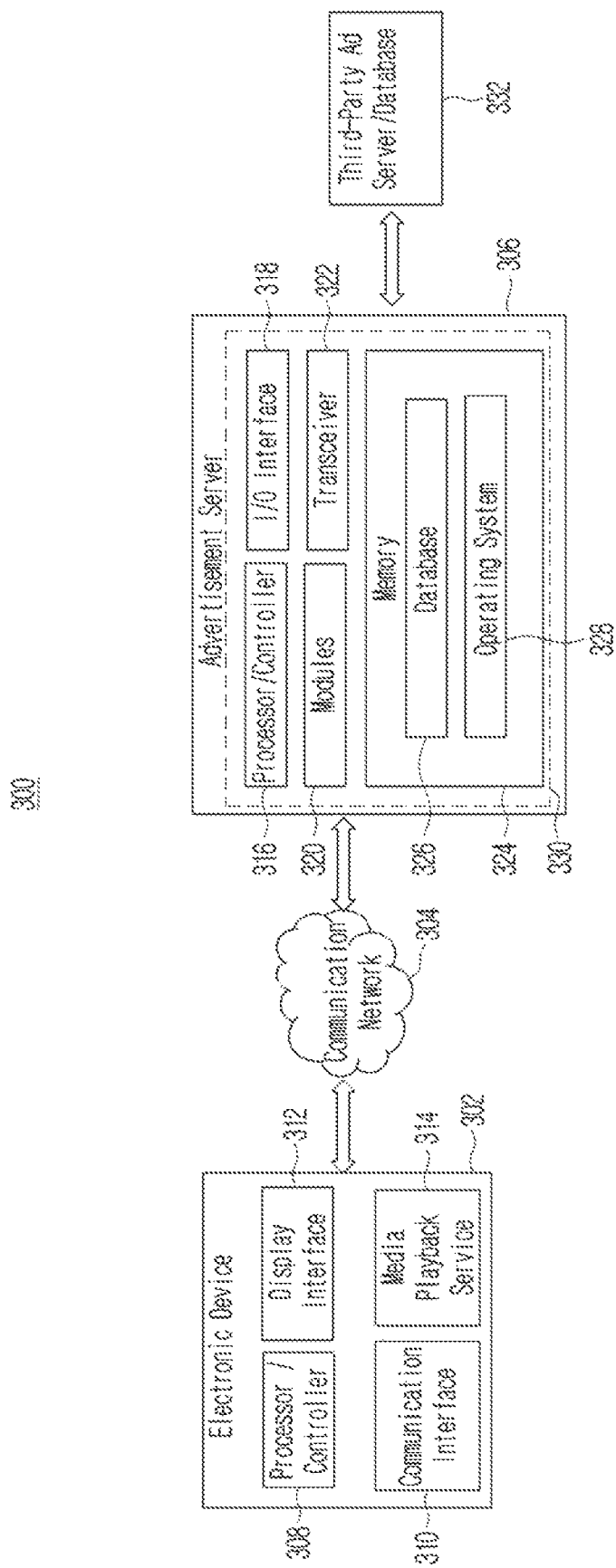
FIG. 3 illustrates a schematic block diagram of an environment for displaying an advertisement during a media playback on an electronic device of a user, according to an embodiment.

FIG. 3 illustrates a schematic block diagram of the environment 300 for displaying an advertisement during a media playback on an electronic device of a user, according to an embodiment. The environment 300 may include an electronic device 302, a communication network 304, an advertisement server 306, and a third-party ad server/database 332. It may be apparent to a person skilled in the art that the environment 300 may include several other components for distribution of ads, such as buffering server, broadcasters, transcoders, ad stitching servers, etc. However, since these components are widely known for delivery/processing of advertisements, for the sake of brevity, these have neither been discussed in the present disclosure, nor shown in the drawings.

In an embodiment, the electronic device 302 may include a processor/controller 308, a communication interface 310, a display interface 312, and a media playback service 314. The electronic device 302 may be configured to trigger an advertisement request for playing advertisements at the display interface 312. The display interface 312 may include a display screen, such as, but not limited to, an LCD or LED display. The advertisement request may be triggered via the media playback service 314. In an embodiment, the media playback service 314 may include an OTT application, a software application, or a web-based service which renders advertisements on the electronic device 302. The media playback service 314 may trigger the advertisement request for inserting/playing advertisements within media content, such as audio/video stream, which is being currently played at the display interface 312 of the electronic device 302. Examples of electronic device 302 may include, but not limited to, a mobile phone, a smart watch, a tablet, a laptop, a smart television or any other electronic device comprising a display capable of playing multimedia, such as audio/video advertisements. The electronic device 302 may be configured to transmit the advertisement request and receive one or more advertisements to be rendered on the display interface 312 via the communication interface 310.

In an embodiment, the media playback service 314 may reside outside the electronic device 302. For instance, the media playback service 314 may reside in a server or cloud-based environment in communication with the electronic device 302, to render ads on the display interface 312 of the electronic device 302.

In an embodiment, the advertisement server 306 may include a system 330 configured to determine one or more advertisements to be rendered at the display interface 312 based on user's preferred viewing time, as discussed throughout this disclosure. The advertisement server 306 may be configured to receive the advertisement request(s) from the media playback service 314 associated with the electronic device 302. Further, the advertisement server 306 identifies one or more advertisements eligible for display on the electronic device 302 and determines a preferred viewing duration associated with the identified advertisements for the user of the electronic device 302. Based on the preferred viewing duration, the advertisement server 306 may be configured to select an appropriate version (e.g., a reduced/summarized version) of an advertisement from among the identified advertisements, as discussed throughout the disclosure. In an embodiment, the advertisement server 306 may be configured to identify advertisement(s) for the electronic device 302 from the third-party ad server/database 332. The third-party ad server/database 332 may be an external server or database which stores advertisements to be presented at the electronic device 302. Since the third-party ad server/databases are well-known, the architecture and functions of such server/databases are not discussed here in detail for the sake of brevity.

In an embodiment, the system 330 may include at least one processor/controller 316, an I/O interface 318, one or more modules 320, a transceiver 322, and a memory 324. The advertisement server 306 may be hosted in a cloud-based architecture in its entirety, or components thereof (e.g., hybrid), in addition to embodiments being entirely on-premises.

In an embodiment, the memory 324 may be communicatively coupled to the at least one processor/controller 316. The memory 324 may be configured to store data, instructions executable by the at least one processor/controller 316. In an embodiment, the modules 320 may be included within the memory 324. The memory 324 may further include a database 326 to store data. The one or more modules 320 may include a set of instructions that may be executed by the processor/controller 316 to cause the system 330 to perform any one or more of the methods disclosed herein. The one or more modules 320 may be configured to perform the operations of the present disclosure using the data stored in the database 326, to perform the methods, as discussed throughout this disclosure. In an embodiment, each of the one or more modules 320 may be a hardware unit which may be outside the memory 324. Further, the memory 324 may include an operating system 328 for performing one or more tasks of the system 330, as performed by a generic operating system in the domain of advertisement servers. The transceiver 322 may be capable of receiving and transmitting signals to and from one or more external entities, such as third party, user inputs, etc. The I/O interface 318 (or communication interface) may be configured to communicate with the electronic device 302 via the communication network 304. Further, the I/O interface 318 may be configured to provide one or more input/output functions, as discussed herein. For the sake of brevity, the architecture and standard operations of operating system 328, memory 324, database 326, processor/controller 316, transceiver 322, and I/O interface 318 are not discussed in detail. In an embodiment, the database 326 may be configured to store the information as required by the one or more modules 320 and processor/controller 316 to perform one or more functions as discussed herein.

In an embodiment, the memory 324 may communicate via a bus within the system 330. The memory 324 may include, but not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 324 may include a cache or random-access memory for the processor/controller 316. In other examples, the memory 324 is separate from the processor/controller 316, such as a cache memory of a processor, the system memory, or other memory. The memory 324 may be an external storage device or database for storing data. The memory 324 may be operable to store instructions executable by the processor/controller 316. The functions, acts or tasks illustrated in the figures or described may be performed by the programmed processor/controller for executing the instructions stored in the memory 324. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing, and the like.

Further, the present disclosure contemplates a non-transitory computer-readable medium in the system 330 that includes instructions or receives and executes instructions responsive to a propagated signal, so that a device connected to a network may communicate voice, video, audio, images, or any other data over a network. Further, the instructions may be transmitted or received over the network via a communication port or interface or using a bus (not shown). The communication port or interface may be a part of the processor/controller 316 or maybe a separate component. The communication port may be created in software or maybe a physical connection in hardware. The communication port may be configured to connect with a network, external media, the display, or any other components in system, or combinations thereof. The connection with the network may be a physical connection, such as a wired Ethernet connection or may be established wirelessly. Likewise, the additional connections with other components of the system may be physical or may be established wirelessly. The network may alternatively be directly connected to the bus.

In an embodiment, the processor/controller 316 may include at least one data processor for executing processes in Virtual Storage Area Network. The processor/controller 316 may include specialized processing units such as, integrated system (bus) controllers, memory management control units, floating point units, graphics processing units, digital signal processing units, etc. In an embodiment, the processor/controller may include a central processing unit (CPU), a graphics processing unit (GPU), or both. The processor/controller 316 may be one or more general processors, digital signal processors, application-specific integrated circuits, field-programmable gate arrays, servers, networks, digital circuits, analog circuits, combinations thereof, or other now known or later developed devices for analyzing and processing data. The processor/controller 316 may implement a software program, such as code generated manually (i.e., programmed).

The processor/controller 316 may be disposed in communication with one or more input/output (I/O) devices via the I/O interface 318. The I/O interface 318 may employ communication code-division multiple access (CDMA), high-speed packet access (HSPA+), global system for mobile communications (GSM), long-term evolution (LTE), WiMax, 5G, 6G, or the like, etc.

The processor/controller 316 may be disposed in communication with the communication network 304 via a network interface. The network interface may be the I/O interface 318. The network interface may connect to the communication network 304. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. The network interface may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

Figure 4:
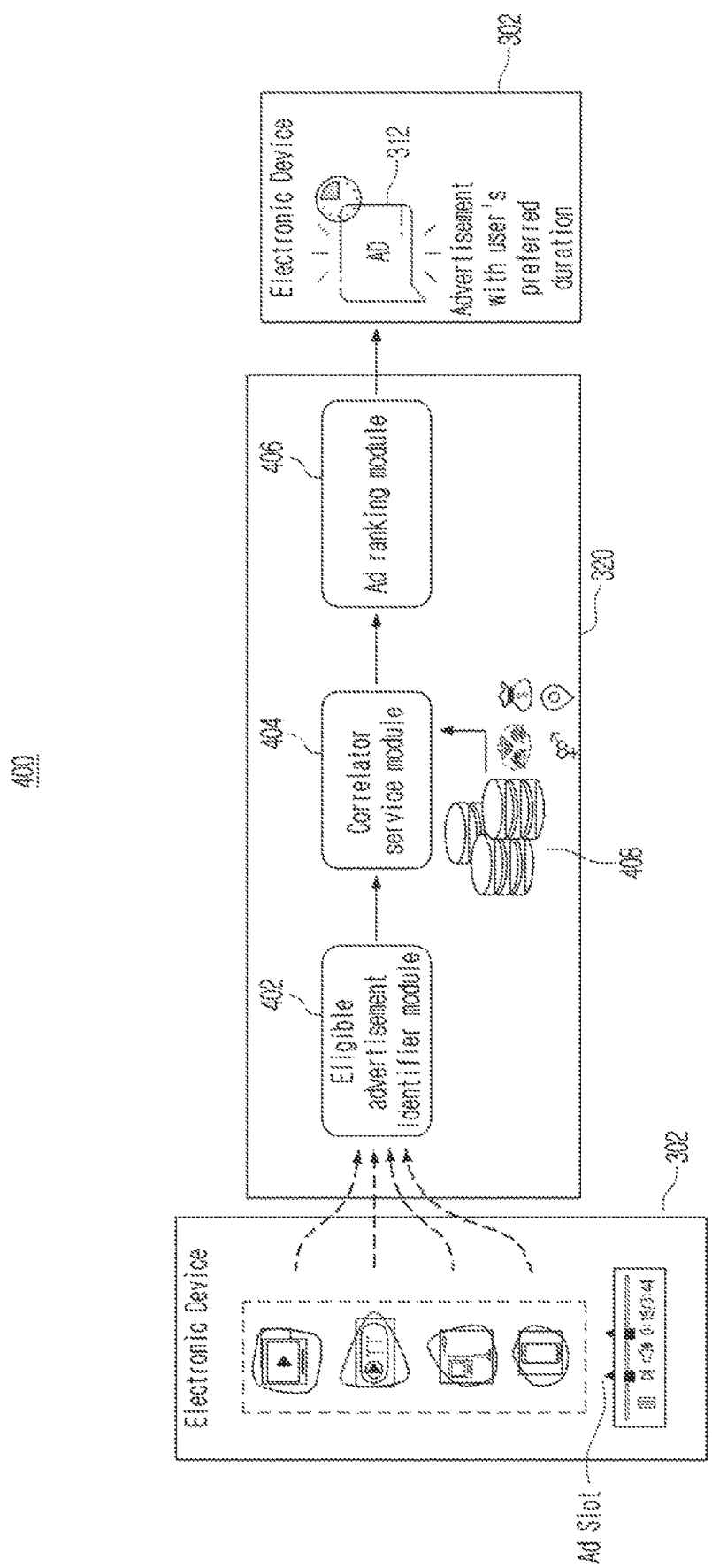
FIG. 4 illustrates a schematic block diagram of modules and a workflow of a system for selecting an advertisement version based on an identified preferred viewing duration, according to an embodiment.

FIG. 4 illustrates a schematic block diagram of modules 320 and a workflow 400 of the system 330 for selecting an advertisement's version based on an identified preferred viewing duration for the advertisement, according to an embodiment. As shown, the modules 320 may include an eligible advertisement identifier module 402, a correlation service module 404, an ad ranking module 406, and a user profile store 408. The modules 320 may be in communication with the electronic device 302 for receiving an advertisement request during initiation of media playback on the electronic device 302. Further, the modules determine an appropriate version of an advertisement to be played at the electronic device 302.

In an embodiment, the eligible advertisement identifier module 402 may be configured to receive an input trigger event such as an advertisement request from an electronic device 302 (or a media playback service associated with the electronic device 302), such as a television, OTT channels, digital signage, mobile device, etc. The electronic device 302 which generated the advertisement request may currently be providing a media playback for a user, such as an online content stream, audio content playback, video content playback, etc. The eligible advertisement identifier module 402 may be configured to identify eligible advertisement(s) for the incoming advertisement request from the electronic device 302. The eligible advertisements may be identified internally or by calling third party services like DSP, AdExchange, etc. The eligible advertisement identifier module 402 is explained in detail in conjunction with FIG. 6.

In an embodiment, the correlation service module 404 may be configured to identify eligible ads duration based on target user's preferred duration. Thus, the correlation service module 404 may be configured to determine eligible ads which may be summarized to get higher relevance and viewing time from the user. The correlation service module 404 may be configured to receive inputs associated with the user profile data from the user profile store 408, to identify target user's preferred duration.

In an embodiment, the correlation service module 404 may be configured to determine a correlation value for one or more advertisers/advertisements to be shortlisted or identified for the users. For example, there may be two different advertisers/advertisements available for a user based on user profile. Each of these two different advertisers may further provide advertisements of different durations such as a 15 second (15s) duration, a 30 second (30s) duration, and a 60 second (60s) duration. A correlation value for each of these advertisements/advertisers may be determined for each duration, for a specific user. The correlation value may be used further by the ad ranking module 406 to determine a rank of each advertiser/advertisement for delivering the advertisement(s) to the electronic device of the user. The correlation value may be determined based on target user's action on previously displayed ads like viewing, skipping, fast-forwarding advertisement; the retrieved user profile; preference or annoyance displayed to ad types, ad genres; particular category/company/domain; purchasing preferences of the target user; actions of user's staying in same household as target user; conversion rate per target user (the percentage of users who take a desired action) feedback. The correlation service module 404 is further explained in detail in conjunction with FIG. 7.

In an embodiment, the ad ranking module 406 may be configured to generate a rank of eligible advertisements as identified by the correlation service module. 404. Specifically, the ad ranking module 406 may be configured to rank eligible advertisements along with multiple durations available, based on one or more parameters, such as monetization, revenue/cost per thousand (CPM), user relevance, long term value generation, etc. In an embodiment, the ad ranking module may be configured to determine a rank of the various identified advertisements based on the correlation value, duration of advertisements, and/or the CPM for each advertisement. The ad ranking module 406 may be configured to share one or more ranked ads with the electronic device 302 for playback of the ads for the user. The ranking module may provide one or more ads to be played back within the total ad slot duration. For example, if the ad slot is for 60 s, and the user's preferred viewing duration is 15 s, then the ad ranking module 406 may be configured to identify multiple ads (e.g., 15s ads) for playback during 60 s ad duration. The ads may be played within the ad slot for which the electronic device 302 had requested ads.

Figure 5A:
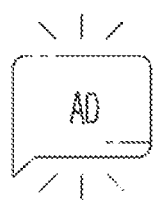
FIGS. 5A and 5B illustrate example techniques of displaying advertisements based on preferred viewing duration of a user, according to an embodiment.
Figure 5A:
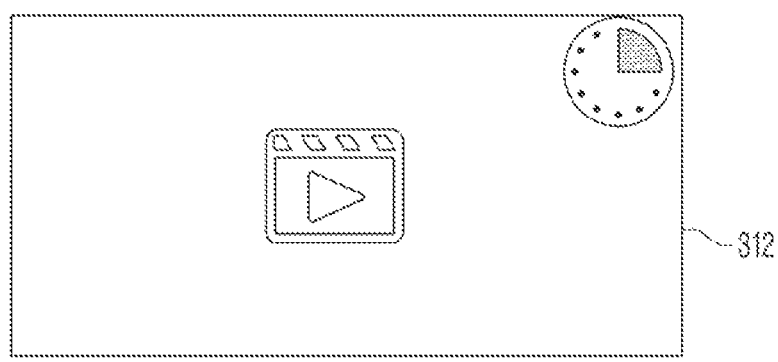
Figure 5B:
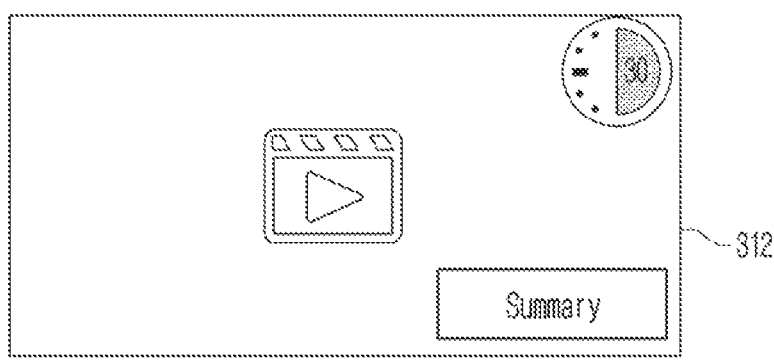

FIGS. 5A and 5B illustrate example techniques of displaying advertisements based on preferred viewing duration of a user (user preferred duration), according to an embodiment. Referring to FIG. 5A, the user preferred duration may either be directly displayed within a user interface of the advertisement display. Referring to FIG. 5B, the user may be provided a choice to either view a complete advertisement, or view an advertisement with user preferred viewing duration.

Figure 6:
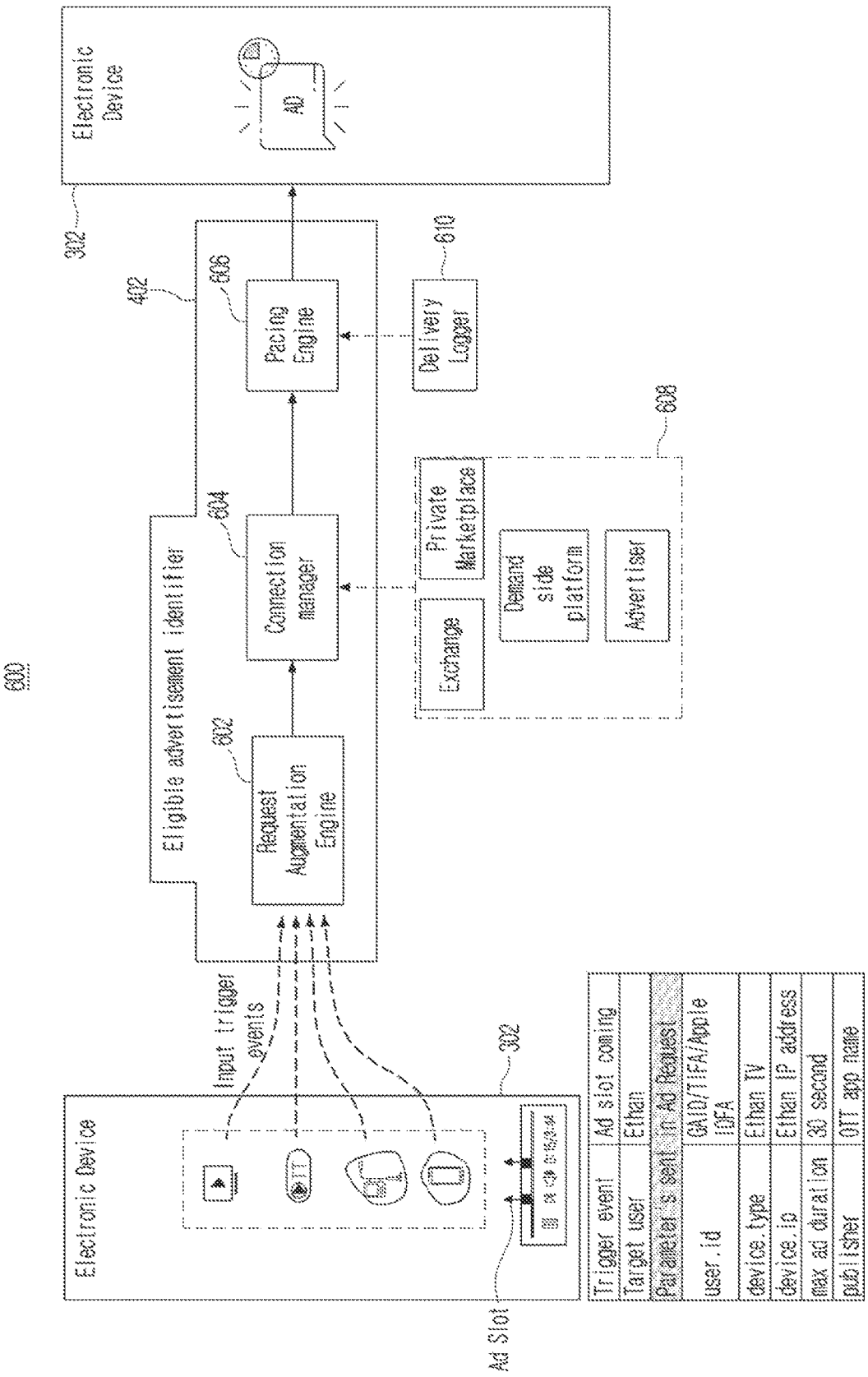
FIG. 6 illustrates a schematic block diagram and workflow of an eligible advertisement identifier module, according to an embodiment.

FIG. 6 illustrates a schematic block diagram and workflow 600 of the eligible advertisement identifier module 402, according to an embodiment. As shown, based on the request received from an electronic device 302, the advertisement request may be augmented, by a request augmentation service 602, with additional information (e.g., country resolution, household etc.). An illustrative set of examples of augmented information is provided below in Table 1:

TABLE 1

| Parameters added by Request Augmentation Engine | |
|---|---|
| device.geo | User's Country |
| household.id | User's House unique id |
| segments | Segments in which user belongs |

As widely known, segments are provided by advertisers based on user interests, behavioral attributes such as age, sex, likes, etc.

Further, a connection manager 604 may be configured to identify advertisers interested by identifying or connecting to third party systems, such as 608. Next, the pacing engine 606 may be configured to determine whether the budget is left in advertiser's deal, which is measured via actions. Finally, the ads are determined as an output of the eligible advertisement identifier module 402. The element 608 comprises one or more generic services entities, such as exchange, private marketplace, demand side platform, and advertiser as conventionally available in an advertisement domain. Further, the delivery logger 610 is a logging service capturing ad display on user device and action taken by user such as 100% video ad view, click, etc. An illustrative example of ads identified by the eligible advertisement identifier module 402 for playback is depicted in Table 2 below:

TABLE 2

| Advertiser | Duration | CPM |
|---|---|---|
| Advertiser 1 | 30 s | $8 |
| Advertiser 2 | 30 s | $7 |

As shown, each of the identified advertisements may comprise advertiser names, duration of the advertisement, and cost per thousand (CPM) associated with each advertisement/advertiser.

Figure 7:
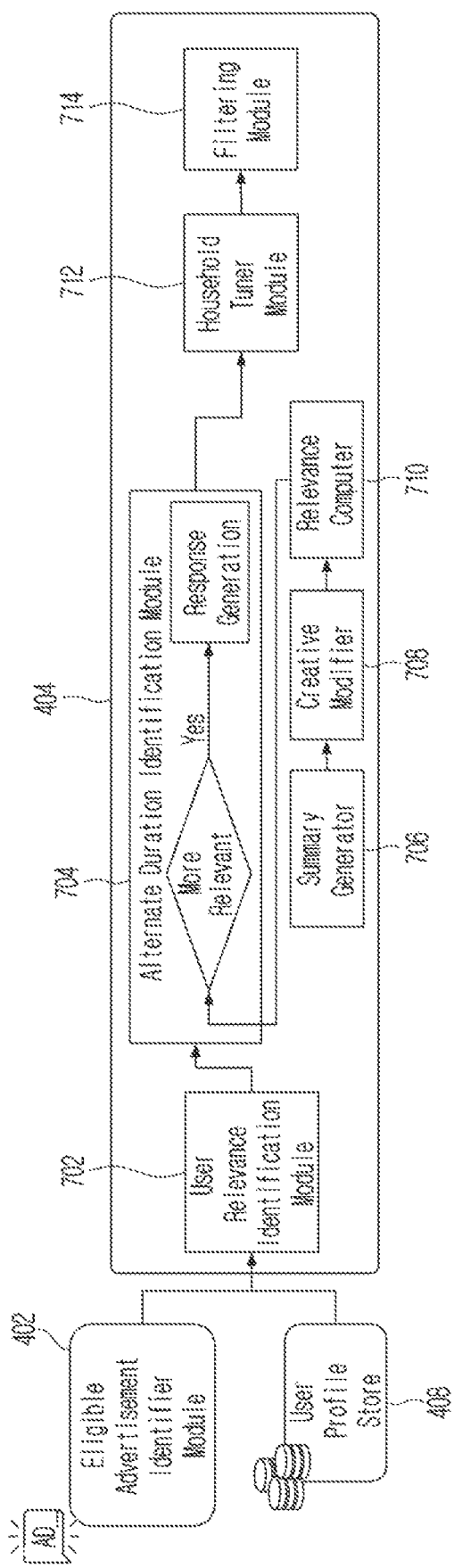
FIG. 7 illustrates a schematic block diagram and workflow of a correlation service module, according to an embodiment.

FIG. 7 illustrates a schematic block diagram and workflow of the correlation service module 404, according to an embodiment. As shown, the correlation service module 404 may be configured to receive eligible advertisement(s) from the eligible advertisement identifier module 402 for an incoming ad request from the electronic device 302. Further, the correlation service module 404 may be configured to receive user profile data from the user profile store 408. Furthermore, the correlation service module 404 may determine a preferred viewing duration of advertisements for a user based on correlation of the user profile data and the identified one or more advertisements. In an embodiment, the correlation service module 404 may analyze the historical user interaction on various advertisements presented to the user in the past, and identify a preferred viewing duration of the user indicating better interaction over advertisements of other durations. For example, a user may prefer viewing a complete advertisement of 15 seconds, while the user may skip advertisements of 30 seconds or longer duration. Thus, the preferred viewing duration in this exemplary scenario may be 15 seconds.

The correlation service module 404 may include a user relevance identification module 702, an alternate duration identification module 704, a household tuner module 712, and a filtering module 714. The user relevance identification module 702 may be configured to determine/identify relevance of advertisements for various users. In an embodiment, the user relevance may be identified in the Table 3 below:

TABLE 3

| | Duration | | | |
|---|---|---|---|---|
| Advertiser | 5 s | 15 s | 30 s | 60 s |
| Advertiser 1 | nv1 | nv2 | nv3 | nv4 |
| Advertiser 2 | . | . | . | . |
| . . . | . | . | . | . |
| Advertiser N | . | . | . | . |

As shown, the various advertisers (e.g., Advertiser 1, Advertiser 2, . . . , Advertiser N) along with their various duration advertisements may be identified for each specific user based on user's advertisement profile (e.g., related to historical interactions of user on presented advertisements).

Further, a summary generator module 706 may be configured to receive key frame identification-based summary using a pre-trained deep neural network model. The summary generator module 706 may be configured to share the key frame identification-based summary with a creative modifier 708 and then a relevance computer 710. The creative modifier 708 may be configured to make one or more creative modifications in the selected/identified advertisement(s) based on one or more parameters of user profile. For example, in addition to user preference of a preferred viewing duration of ads, the user's ethnicity may be identified as "Asian" from the user profile store. To present advertisements for enhanced user interaction, the creative modifier 708 may be configured to modify advertisements to include one or more aspects associated with user's ethnicity. For instance, the main actor in the selected/identified advertisement may be identified that may be of non-Asian ethnicity, and an Asian face may be selected from a database for swapping with the non-Asian face in the originally identified ad. Such swapping by the creating modifier may facilitate a better chance of ad view/click by the user.

The alternate duration identification module 704 may be configured to determine more relevance of the received input from the relevance computer 710 and generate a response. The response may be generated or modified in case of more relevant summary available at the correlation service module 404. For example, a wrapper may be created in cast of Video Ad-Serving Template (VAST) as well.

Further, the household tuner module 712 may be configured to determine household's preferred duration. Specifically, the household tuner module 712 may identify a relationship of eligible ads and various alternate duration available with action of other users in target user household. Subsequently, the filtering module 714 may be configured to identify valid bids including creative review for summarized ads and frequency capping for the ads.

Figure 8:
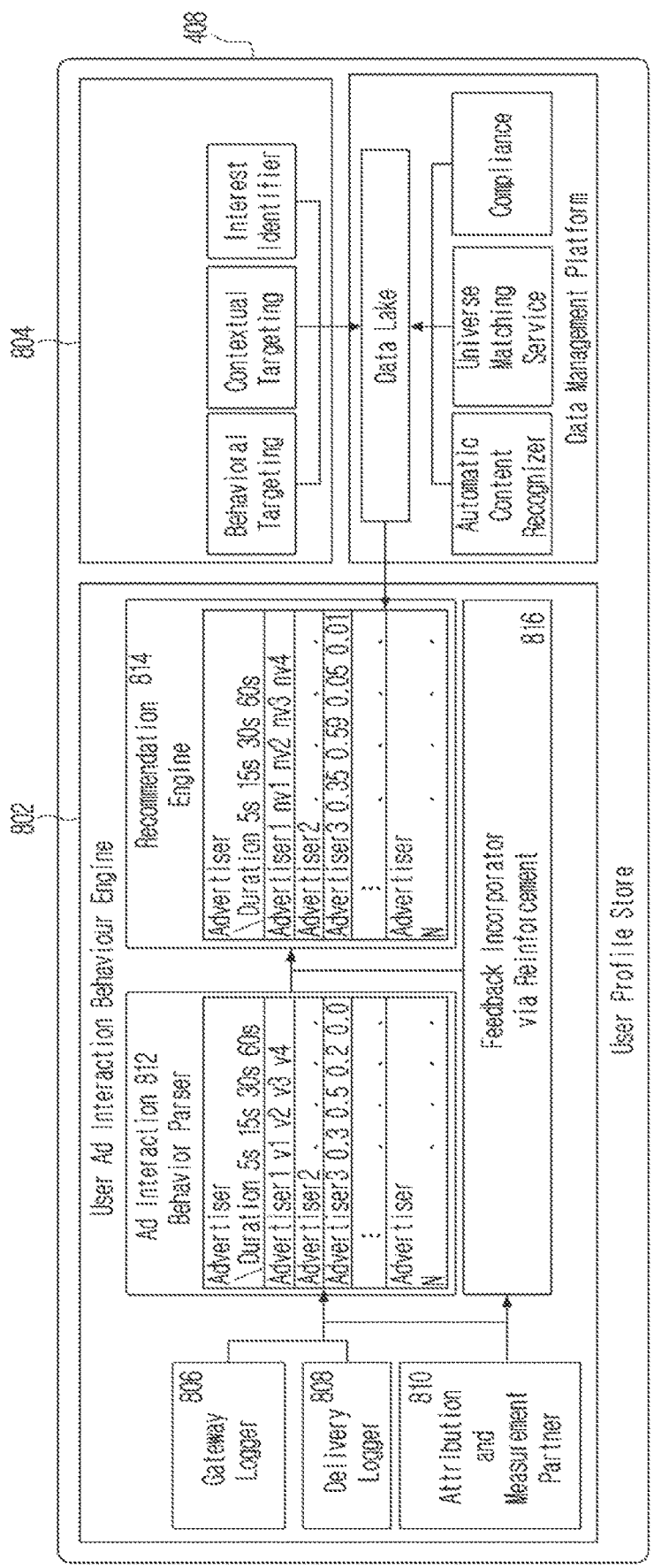
FIG. 8 illustrates a schematic block diagram and workflow of a user profile store for providing relevant viewing duration advertisements, according to an embodiment.

FIG. 8 illustrates a schematic block diagram and workflow of the user profile store 408 for providing relevant viewing duration advertisements, according to an embodiment. In an embodiment, the user profile store 408 comprises a user interaction behavior engine 802 and a data management platform 804. The user interaction behavior engine 802 may include a gateway logger 806, a delivery logger 808, and an attribution and measurement partner 810. The gateway logger 806, delivery logger 808, and the attribution and measurement partner 810 are configured to interpret activity history of users to identify user relevance information, as indicated in Table 3 above. The ad interaction behavior parser 812 may be configured to parse how the users interact with presented ads over a period of time and prepare a recommendation of various advertisements using a recommendation engine 814. Further, feedback of various users based on activity monitoring on ads may be incorporated at 816 to continuously update the recommendations. The data management platform 804 may include various contextual monitoring of users for advertisements. For example, the data management platform 804 may include behavioral targeting, contextual targeting, and an interest identifier to derive the user profile. Behavioral targeting is configured to identify behavioral attributes of a user and share with other modules for selection of advertisements. The interest identifier is configured to identify user interests such as hobbies, etc. Further, the data management platform 804 may include a data lake in communication with automatic content recognizer, universe matching service, and compliance. The data lake is a data repository designed to store large amount of data and quickly process and provide requested data.

Figure 9:
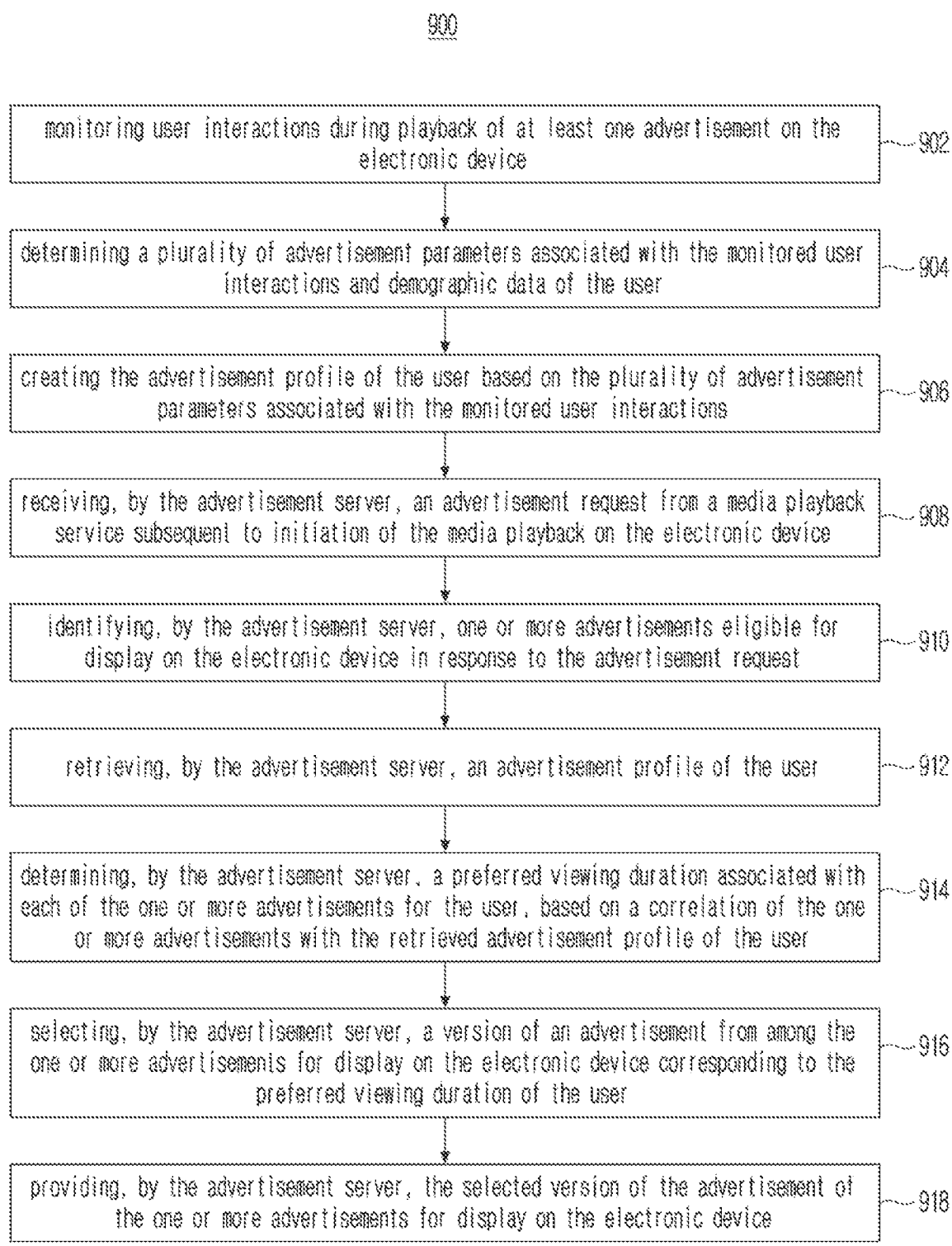
FIG. 9 illustrates a process flow depicting a method of displaying an advertisement during a media playback on an electronic device of a user, according to an embodiment.

FIG. 9 illustrates a process flow depicting a method 900 of displaying an advertisement during a media playback on an electronic device of a user, according to an embodiment. The method 900 may be performed by a system within an advertisement server (e.g., system 330 within the advertisement server 306).

At operation 902, the method 900 comprises monitoring user interactions during playback of at least one advertisement on the electronic device. The monitoring of user interactions may be performed over a predefined period of time during playback of advertisements at one or more user devices. As discussed previously, a user's behavioral, contextual, and interests may be identified during playback of advertisements over a period of time to build a user profile. The monitoring of user interactions and profile of the user may be used for presenting/identifying advertisements in future for the user.

At operation 904, the method 900 comprises determining a plurality of advertisement parameters associated with the monitored user interactions and demographic data of the user. In an embodiment, the plurality of advertisement parameters may include a genre of the at least one advertisement, a duration of the at least one advertisement, and a user action on the at least one advertisement. The demographic data of the user may comprise at least one purchasing preference, viewed content, one or more applications visited, an estimated worth of the user, and actions of one or more other users staying in same household as the user.

In an embodiment, the user action on the at least one advertisement may include, but not limited to, watching the at least one advertisement, skipping the at least one advertisement, changing volume, fast forwarding the at least one advertisement, and viewing one or more additional details associated with the at least one advertisement.

At operation 906, the method 900 comprises creating the advertisement profile of the user based on the plurality of advertisement parameters associated with the monitored user interactions.

At operation 908, the method 900 comprises receiving, by the advertisement server, an advertisement request from a media playback service subsequent to initiation of the media playback on the electronic device.

At operation 910, the method 900 comprises identifying, by the advertisement server, one or more advertisements eligible for display on the electronic device in response to the advertisement request.

At operation 912, the method 900 comprises retrieving, by the advertisement server, an advertisement profile of the user. The identification of advertisements may be performed in conjunction with the retrieved advertisement profile of the user from the user profile store comprising user's advertisement profile associated with past behavior/interest of the user on various advertisements.

At operation 914, the method 900 comprises determining, by the advertisement server, a preferred viewing duration associated with each of the one or more advertisements for the user, based on a correlation of the one or more advertisements with the retrieved advertisement profile of the user. The preferred viewing duration may indicate that a user prefers to watch advertisements of a certain duration over other durations. In other words, the preferred viewing duration may indicate that the user has a better interaction chance (viewing, clicking, etc.) for such duration advertisements over other duration advertisements.

In an embodiment, the correlation may be determined based on a correlation value for one or more advertisers/advertisements to be shortlisted or identified for the users. For example, there may be two different advertisers/advertisements available for a user based on user profile. Each of these two different advertisers may further provide advertisements of different durations such as 15 s, 30 s, and 60 s. A correlation value for each of these advertisements/advertisers may be determined for each duration, for a specific user. The correlation value may be used further by the ranking module to determine a rank of each advertiser/advertisement for delivering the advertisement(s) to the electronic device of the user. The correlation value may be determined based on target user's action on previously displayed ads like viewing, skipping, fast-forwarding advertisement; the retrieved user profile; preference or annoyance displayed to ad types, ad genres; particular category/company/domain; purchasing preferences of the target user; actions of user's staying in same household as target user; conversion rate per target user (the percentage of users who take a desired action) feedback.

At operation 916, the method 900 comprises selecting, by the advertisement server, a version of an advertisement from among the one or more advertisements for display on the electronic device corresponding to the preferred viewing duration of the user. In an embodiment, the selection of a version may include selecting a summarized version of the advertisement of the one or more advertisements for display on the electronic device. The summarized version may be determined by the advertisement server corresponding to the preferred viewing duration of the user, wherein an original version of the advertisement corresponds to a predefined duration different from the summarized version. In an embodiment, the summarized version of the advertisement(s) may be determined using techniques, such as, but not limited to, Detect-to-Summarizer Network (DS-Net), Summarizing Videos With Attention (VASNet), and Diversity-Representativeness Reward. In another embodiment, the summarized version(s) of the advertisement(s) may be received directly from the advertisers/content providers (e.g., a third-party server/database). In this embodiment, the system of the present disclosure may be configured to select a version from the received version(s) of the advertisements based on the preferred viewing duration of the user.

At operation 918, the method 900 comprises providing, by the advertisement server, the selected version of the advertisement of the one or more advertisements for display on the electronic device. In an embodiment, the providing may include providing the selected version (e.g., the summarized version) as well as the original version of the advertisement.

In an embodiment where multiple advertisements are selected/identified for playback at the electronic device of the user, a rank may be provided to each such selected advertisement and such advertisements may be played at the electronic device in the order of rank.

Figure 10:
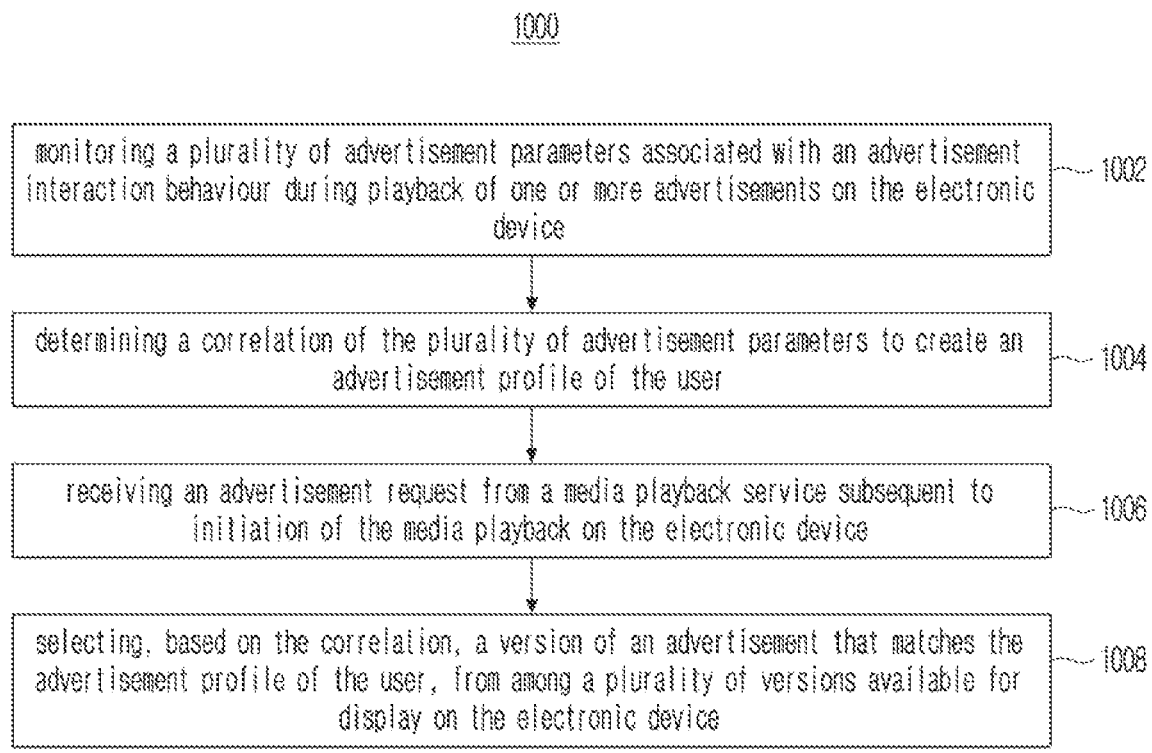
FIG. 10 illustrates a process flow depicting a method of displaying an advertisement during a media playback on an electronic device of a user, according to another embodiment.

FIG. 10 illustrates a process flow depicting a method 1000 of displaying an advertisement during a media playback on an electronic device of a user, according to another embodiment. The method 1000 may be performed by a system within an advertisement server (e.g., system 330 within the advertisement server 306). Some of the operations of method 1000 are already discussed above with reference to FIG. 9, and hence, these are not discussed in detail here again for the sake of brevity.

At operation 1002, the method 1000 comprises monitoring a plurality of advertisement parameters associated with an advertisement interaction behavior during playback of one or more advertisements on the electronic device.

At operation 1004, the method 1000 comprises determining a correlation of the plurality of advertisement parameters to create an advertisement profile of the user.

At operation 1006, the method 1000 comprises receiving an advertisement request from a media playback service subsequent to initiation of the media playback on the electronic device.

At operation 1008, the method 1000 comprises selecting, based on the correlation, a version of an advertisement that matches the advertisement profile of the user, from among a plurality of versions available for display on the electronic device. The version may be a summarized version of the advertisement. The summarized version may be determined by the advertisement server corresponding to the preferred viewing duration of the user, wherein an original version of the advertisement corresponds to a predefined duration different from the summarized version.

While the above operations are shown in FIGS. 9 and 10 and described in a particular sequence, the operations may occur in variations to the sequence in accordance with various embodiments of the present disclosure. Further, the details related to various operations of FIGS. 9 and 10, which are already covered in the description related to FIGS. 1-8 are not discussed again in detail here for the sake of brevity.

Figure 11:
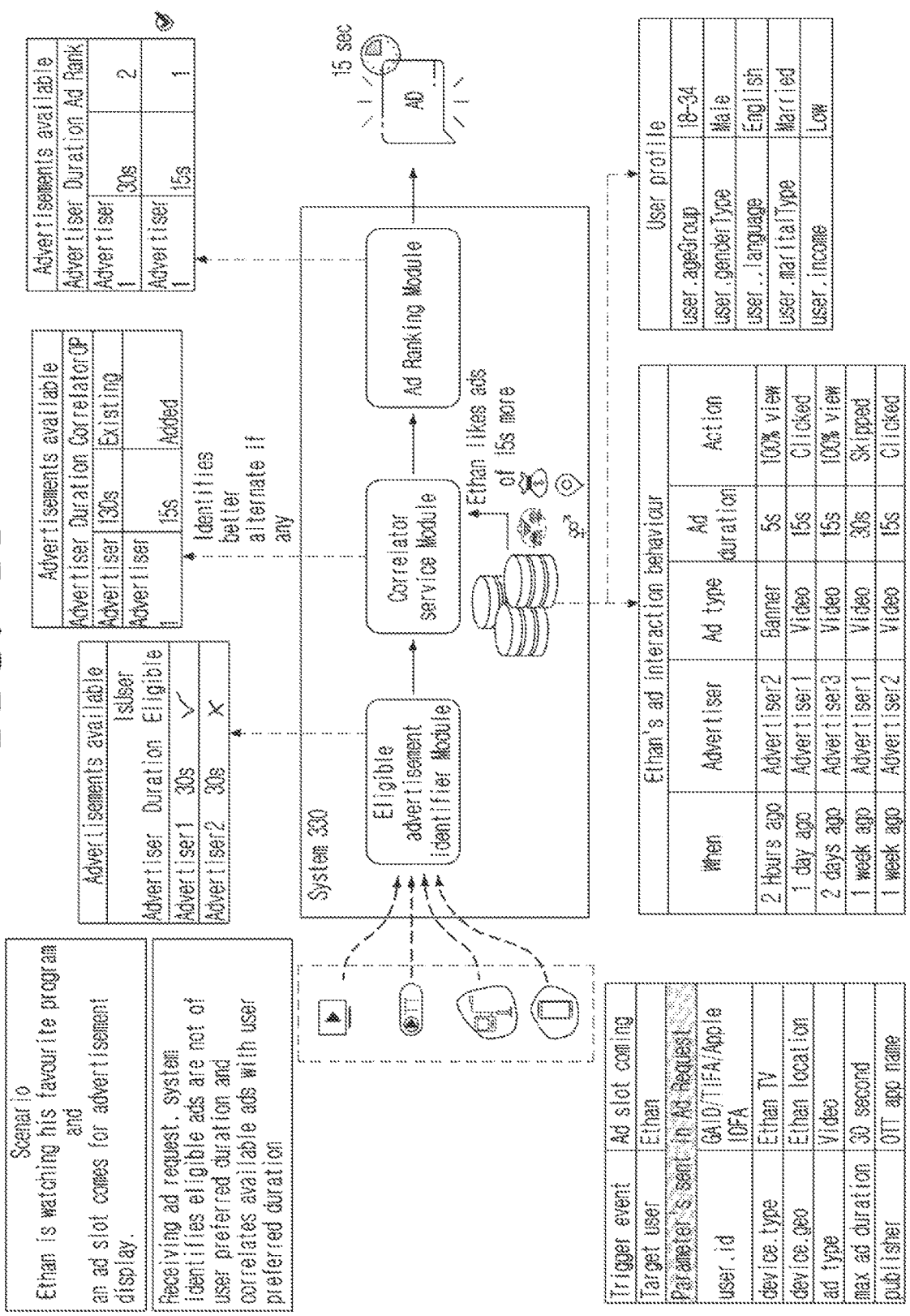
FIG. 11 illustrates an example of an ad interaction behavior-based selection, according to an embodiment.

FIG. 11 illustrates an example of an ad interaction behavior-based selection, according to an embodiment.

As shown, a user may be watching his/her favorite program at his/her device. The media playback service associated with the device may trigger a request for the advertisement server system. The system may identify one or more eligible ads to be played at the user device. The system may correlate available ads with user preferred duration, however, the eligible ads may not be of user preferred duration.

For example, the user's old ad interaction behavior stored at user profile store may indicate that he/she likes 15 s ads more (probability of performing action like click on 15 s ad is high). In the current example, the available eligible ads may be of 30 s, but the preferred duration for the user may be 15 s. Thus, the system may determine a summarized version of 15 s corresponding to the original 30 s video, which shall have a higher probability of being watched/clicked by the user.

Figure 12:
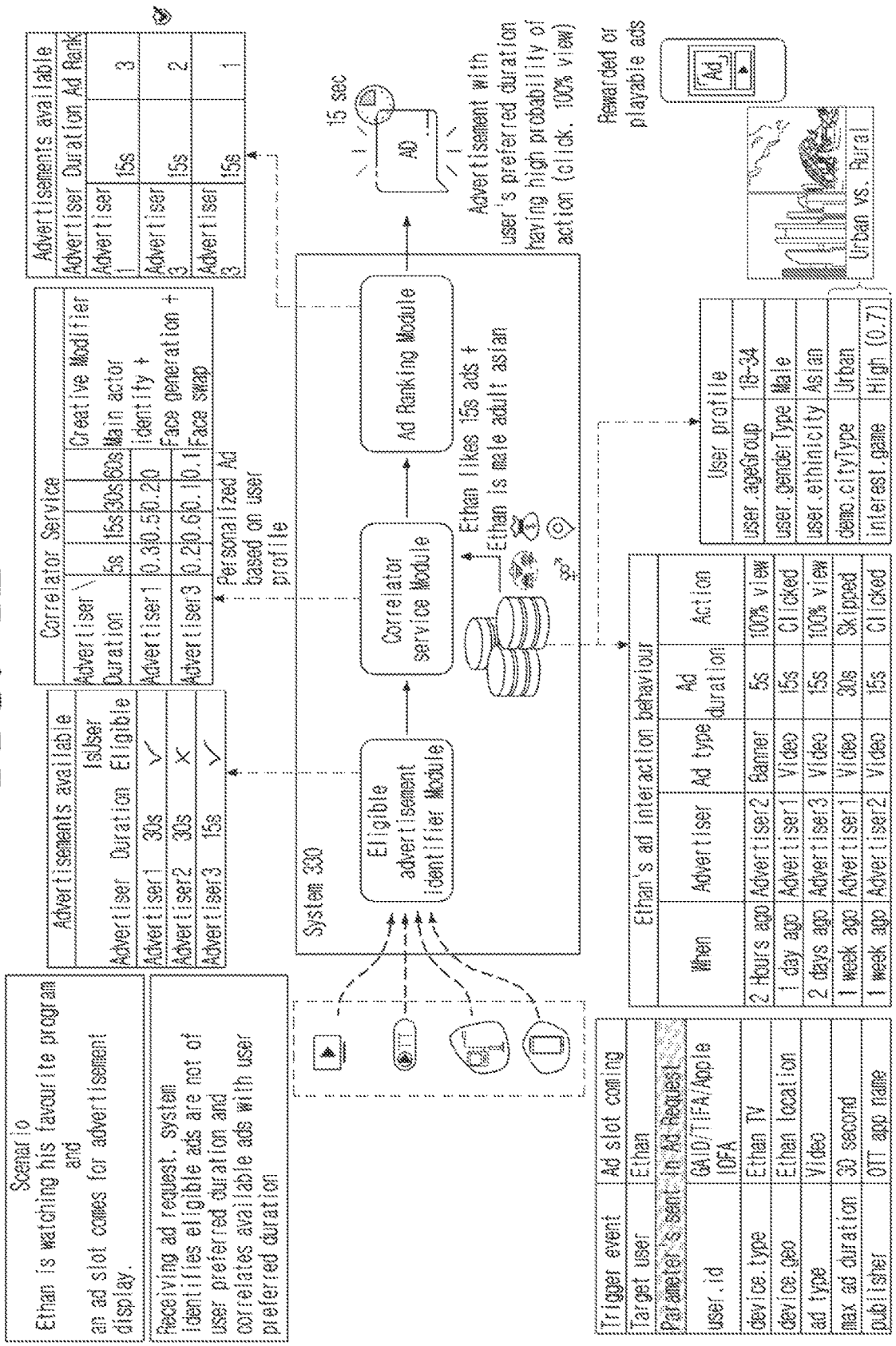
FIG. 12 illustrates an example of personalized summary ads, according to an embodiment.

FIG. 12 illustrates an example of personalized summary ads, according to an embodiment. In addition to user preference of 15 s ads, the user's ethnicity may be "Asian". Hence, a creative modifier module in the system may be configured to identify the main actor in the selected advertisement, and to select an Asian face for swapping with the non-Asian face in the originally identified ad. Such swapping by the creating modifier may facilitate a better chance of ad view/click by the user.

Figure 13:
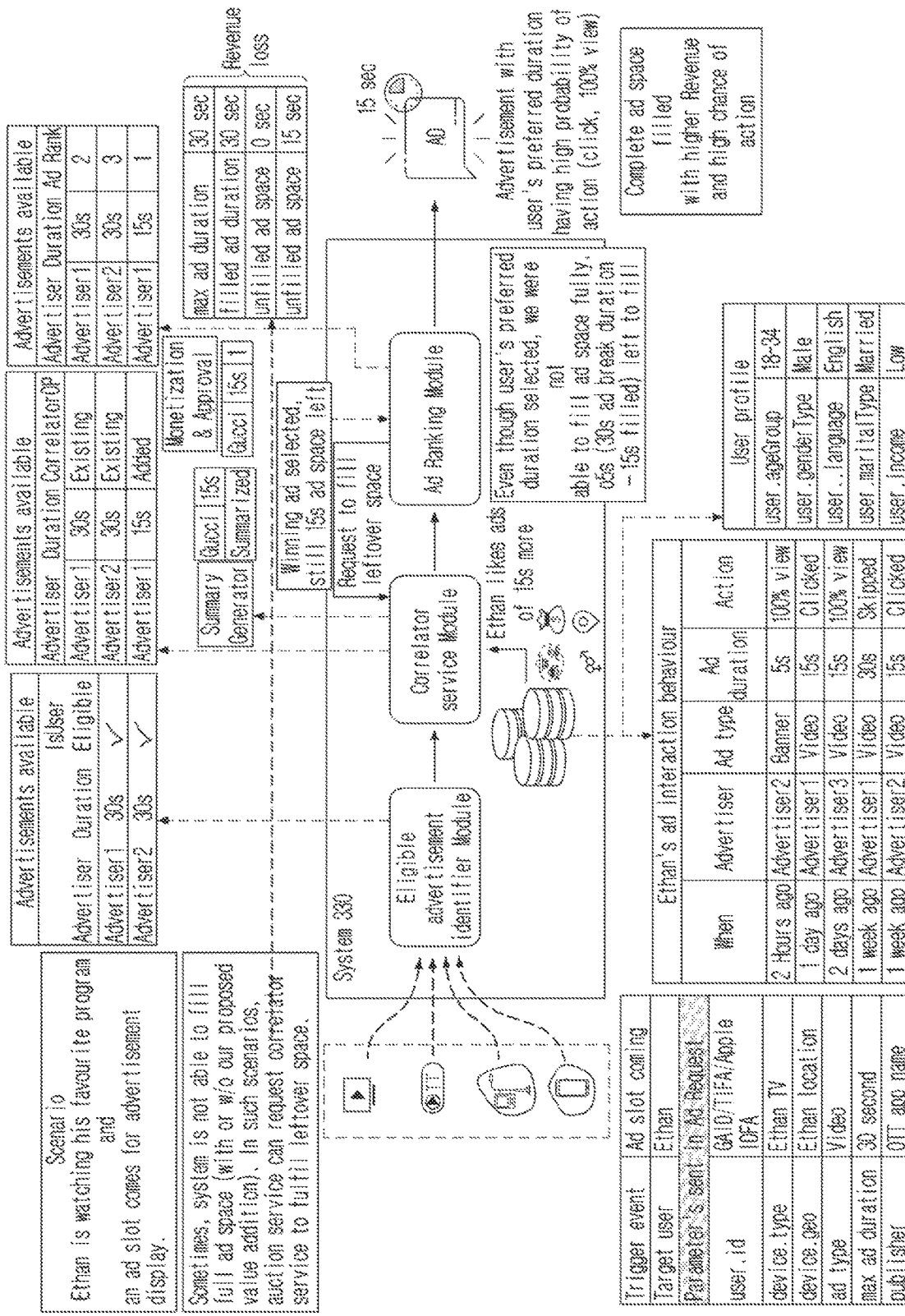
FIG. 13 illustrates an example of filling left over ad space with summarized ads, according to an embodiment.

FIG. 13 illustrates an example of filling left over ad space with summarized ads, according to an embodiment. In the current example, in addition to selecting 15 s ads for the user as per user's preferred duration selected, there may not be sufficient ads for the available slot for advertisements to be played at the user device. In the current instance, 15 s (30 s ad break duration −15 s filled) may be left to fill. This duration may be filled with higher revenue ads and may have a high chance of action from the user.

At least by virtue of aforesaid, the present subject matter at least provides the following advantages. With the present methodology, the user annoyance is minimized with the advertisements while preserving their effectiveness. Further, the present methodology creates opportunities for advertisers to better connect with audience (audience who likes longer form of ads are shown long form ads). Since, ads are selected based on users' preferred viewing durations, a higher view through rates may be achieved, resulting in higher advert recall and message association. A new monetization strategy is created to fulfil leftover space with opportunity to gain more revenue. Further, the market differentiating factor for this solution is that it will automatically generate and selects advertisements that are aligned more with user's preferred viewing duration. Further, the present disclosure enhances the user experience in terms of consumption of video advertisements by determining a user preferred duration for each eligible advertisement and transferring a summarized version of at least one eligible advertisement for playback at the user device corresponding to the determined user preferred duration.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims, and their equivalents.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for displaying an advertisement during a media playback on an electronic device, the method comprising:

receiving, by an advertisement server, an advertisement request from a media playback service subsequent to an initiation of a media playback on the electronic device of a user;

identifying, by the advertisement server, at least one eligible advertisement, based on the advertisement request;

retrieving, by the advertisement server, an advertisement profile of the user;

determining, by the advertisement server, a preferred viewing duration associated with each of the at least one eligible advertisement, based on a correlation of each of the at least one eligible advertisement with the advertisement profile of the user; and obtaining, by the advertisement server, a summarized version of an advertisement selected from the at least one eligible advertisement based on the preferred viewing duration of the user.

2. The method of claim 1, further comprising:
monitoring, by the advertisement server, at least one user interaction during at least one advertisement playback on the electronic device;
determining, by the advertisement server, a plurality of advertisement parameters associated with each of the at least one user interaction, and a plurality of advertisement parameters associated with a demographic data of the user; and
creating, by the advertisement server, the advertisement profile of the user based on the plurality of advertisement parameters associated with the at least one user interaction.

3. The method of claim 2, wherein the demographic data of the user comprises at least one of a purchasing preference, a viewed content, a visited application, an estimated worth of the user, or an action of another user in a same household as the user.

4. The method of claim 2, wherein the plurality of advertisement parameters comprise at least one of an advertisement genre, an advertisement duration, or a user action associated with each advertisement displayed on the electronic device during the at least one advertisement playback.

5. The method of claim 4, wherein the user action associated with each advertisement displayed on the electronic device during the at least one advertisement playback comprises at least one of watching the advertisement, skipping the advertisement, changing a volume level, fast forwarding the advertisement, or viewing an additional detail associated with the advertisement.

6. The method of claim 1, wherein the summarized version of the selected advertisement is associated with a first playback duration that is different than a second playback duration associated with an original version of the selected advertisement.

7. The method of claim 6, wherein the summarized version of the selected advertisement is associated with a higher probability of user interaction than the original version of the selected advertisement.

8. The method of claim 6, further comprising:
providing, by the advertisement server, the summarized version of the selected advertisement, for display on the electronic device.

9. The method of claim 6, further comprising:
providing, by the advertisement server, the summarized version of the selected advertisement and the original version of the selected advertisement, for display on the electronic device.

10. The method of claim 1, wherein the obtaining the summarized version of the advertisement selected from the at least one eligible advertisement based on the preferred viewing duration of the user comprises:
determining, by the advertisement server, the summarized version of the selected advertisement by modifying at least one of a human face, a background, a voice, or a language in the selected advertisement, based on the advertisement profile of the user.

11. The method of claim 1, further comprising:
obtaining, by the advertisement server, a plurality of versions of each of a plurality of advertisements selected from the at least one eligible advertisement based on the preferred viewing duration of the user; and providing, by the advertisement server, the plurality of versions of each of the plurality of selected advertisements, for display on the electronic device.

12. The method of claim 11, wherein each of the plurality of versions of the plurality of selected advertisements are associated with a rank for displaying on the electronic device.

13. A method of displaying an advertisement during a media playback on an electronic device, the method comprising:
monitoring a plurality of advertisement parameters associated with an advertisement interaction behavior of a user, during at least one advertisement playback on the electronic device of the user;
determining a correlation of the plurality of advertisement parameters with the advertisement interaction behavior of the user, to create an advertisement profile of the user;
receiving an advertisement request from a media playback service subsequent to initiation of a media playback on the electronic device; and
obtaining, based on the correlation, a summarized version of a selected advertisement that matches the advertisement profile of the user, from a plurality of versions of the selected advertisement.

14. The method of claim 13, wherein the plurality of advertisement parameters comprise at least one of an advertisement genre, an advertisement duration, or a user action during playback of the advertisement.

15. The method of claim 13, further comprising:
monitoring a plurality of advertisement parameters associated with a demographic data of the user, during at least one advertisement playback on the electronic device.

16. A server comprising:
at least one memory storing instructions; and
at least one processor configured to execute the instructions to:
receive an advertisement request from a media playback service subsequent to an initiation of a media playback on an electronic device of a user;
identify at least one eligible advertisement, based on the advertisement request;
retrieve an advertisement profile of the user;
determine a preferred viewing duration associated with each of the at least one eligible advertisement, based on a correlation of each of the at least one advertisement with the advertisement profile of the user; and
obtain a summarized version of an advertisement selected from the at least one eligible advertisement based on the preferred viewing duration of the user.

17. The server of claim 16, wherein the at least one processor is further configured to execute to the instructions to:
monitor at least one user interaction during at least one advertisement playback on the electronic device;
determine a plurality of advertisement parameters associated with each of the at least one user interaction, and a plurality of advertisement parameters associated with a demographic data of the user; and
create the advertisement profile of the user based on the plurality of advertisement parameters associated with the at least one user interaction.

18. The server of claim 17, wherein the demographic data of the user comprises at least one of a purchasing preference, a viewed content, a visited application, an estimated worth of the user, or an action of another user in a same household as the user.

19. The server of claim 16, wherein the summarized version of the selected advertisement is associated with a first playback duration that is different than a second playback duration associated with an original version of the selected advertisement.

20. The server of claim 19, wherein the summarized version of the selected advertisement is associated with a higher probability of user interaction than the original version of the selected advertisement.

21. The method of claim 1, wherein the obtaining the summarized version of the advertisement comprises determining that a duration of the summarized version fits into a remaining amount of time at an end of a series of advertisements played subsequent to the initiation of the media playback on the electronic device of the user, the remaining amount of time being a difference between an allotted time for the series of advertisements and a duration of the series of advertisements other than the summarized version.

* * * * *